(12) United States Patent
Lancaster, III et al.

(10) Patent No.: US 12,258,154 B2
(45) Date of Patent: Mar. 25, 2025

(54) LOAD WRAPPING APPARATUS AND METHOD UTILIZING PACKAGING MATERIAL WITH RECYCLED CONTENT

(71) Applicant: Lantech.com, LLC, Louisville, KY (US)

(72) Inventors: Patrick R. Lancaster, III, Louisville, KY (US); Christian Michael Gruner, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 154 days.

(21) Appl. No.: 17/799,021

(22) PCT Filed: Feb. 25, 2021

(86) PCT No.: PCT/US2021/019538
§ 371 (c)(1),
(2) Date: Aug. 11, 2022

(87) PCT Pub. No.: WO2021/178189
PCT Pub. Date: Sep. 10, 2021

(65) Prior Publication Data
US 2023/0066888 A1  Mar. 2, 2023

Related U.S. Application Data

(60) Provisional application No. 62/984,514, filed on Mar. 3, 2020.

(51) Int. Cl.
*B65B 11/02* (2006.01)
*B65B 41/12* (2006.01)

(52) U.S. Cl.
CPC ............ *B65B 11/025* (2013.01); *B65B 41/12* (2013.01)

(58) Field of Classification Search
USPC .......................................................... 53/399
See application file for complete search history.

(56) References Cited

U.S. PATENT DOCUMENTS

| 3,734,994 A | 5/1973 | Blecha |
| 5,653,093 A | 8/1997 | Delledonne |
| 2009/0313956 A1 | 12/2009 | Martinez Sampedro |
| 2012/0124944 A1 | 5/2012 | Lancaster, III et al. |

(Continued)

FOREIGN PATENT DOCUMENTS

| EP | 0152960 A2 | 8/1985 |
| JP | H0924905 A | 1/1997 |
| WO | 2021178189 | 9/2021 |

OTHER PUBLICATIONS

International Search Report and Written Opinion of PCT Application No. PCT/US2021/019538, dated May 5, 2021.

(Continued)

*Primary Examiner* — Chinyere J Rushing-Tucker
(74) *Attorney, Agent, or Firm* — Gray Ice Higdon

(57) ABSTRACT

A method, apparatus and program product may utilize various approaches for adapting stretch wrapping to accommodate lower quality packaging materials such as packaging materials including recycled content, including heating a web of packaging material prior to or during pre-stretching, utilizing multiple pre-stretch zones and/or reducing surface adhesion of one or more pre-stretch rollers used by a load wrapping apparatus.

20 Claims, 6 Drawing Sheets

(56) References Cited

U.S. PATENT DOCUMENTS

| | | |
|---|---|---|
| 2016/0227811 A1 | 8/2016 | Jones et al. |
| 2018/0022490 A1* | 1/2018 | Harrison et al. |
| 2019/0118982 A1* | 4/2019 | Johnson .............. B65B 11/045 |
| 2019/0143580 A1* | 5/2019 | Bowden .............. B29C 51/46 |
| | | 264/288.4 |
| 2020/0039673 A1* | 2/2020 | Mitchell .............. B65B 41/16 |
| 2021/0039815 A1* | 2/2021 | Martin .............. B65B 11/025 |
| 2022/0169407 A1* | 6/2022 | Magri .............. B65B 11/045 |
| 2022/0388285 A1* | 12/2022 | Modeé .............. B32B 27/32 |
| 2023/0049546 A1* | 2/2023 | Ceré .............. B65B 57/04 |
| 2023/0066888 A1 | 3/2023 | Lancaster, III et al. |

OTHER PUBLICATIONS

International Preliminary Report on Patentability of PCT Application No. PCT/US2021/019538, dated Sep. 15, 2022.

United States Patent & Trademark Office; Notice of Allowance issued in U.S. Appl. No. 15/667,344; 26 pages; dated Jul. 3, 2024.

Canadian Intellectual Property Office; Second Examiner's Report issued for Canadian Application No. 3167645; 5 pages; dated Aug. 30, 2024.

United States Patent & Trademark Office; Notice of Allowance issued in U.S. Appl. No. 15/667,344; 26 pages; dated Oct. 21, 2024.

\* cited by examiner

LOAD WRAPPING APPARATUS AND METHOD UTILIZING PACKAGING MATERIAL WITH RECYCLED CONTENT

FIELD OF THE INVENTION

The invention generally relates to wrapping loads with packaging material through relative rotation of loads and a packaging material dispenser.

BACKGROUND OF THE INVENTION

Various packaging techniques have been used to build a load of unit products and subsequently wrap them for transportation, storage, containment and stabilization, protection and waterproofing. One system uses wrapping machines to stretch, dispense, and wrap packaging material, e.g., film, around a load. The packaging material may be pre-stretched before it is applied to the load. Wrapping can be performed as an inline, automated packaging technique that dispenses and wraps packaging material in a stretch condition around a load on a pallet to cover and contain the load. Stretch wrapping, whether accomplished by a turntable, rotating arm, vertical rotating ring, or horizontal rotating ring, typically covers the four vertical sides of the load with a stretchable packaging material such as polyethylene packaging material. In each of these arrangements, relative rotation is provided between the load and the packaging material dispenser to wrap packaging material about the sides of the load.

Film breaks are one of the most frequent and problematic sources of machine downtime and loss of "centerline" wrapper settings to a standard. Film breaks have many causes inherent to the wrapping process that can be mitigated, including, for example, irregularities or sharp points in the load or pallet, mechanical issues with rollers and clamps, electronic control issues around maintenance of film or packaging material tension during start, acceleration, and ending of a wrap operation or cycle, etc. These various causes of film breaks may be mitigated in many instances with more effective handling of the wrapping process.

However, film breaks are also impacted by fluctuations in the packaging material quality, where random and unpredictable changes in packaging material characteristics (often within a single packaging material roll) can cause a packaging material's resistance to film breaks to be reduced. Random flaws in a packaging material web such as gels, carbon particles, gauge band including shipping and handling damage to the packaging material roll remain problematic since they are generally difficult to sense or predict.

Packaging material quality can also be significantly impacted by the presence of recycled content in the packaging material. Social and political pressures regarding the sustainability of packaging materials, and in particular of packaging materials incorporating plastics, continues to increase. While many post-consumer materials have found their way back into plastic products such as bottles and other food containers, these products are much more adaptable to accepting the contamination and physical characteristic fluctuations that are encountered in the stream of recycled materials. The packaging material used for stretch wrapping, however, is subjected to significant stress and strain during the wrapping process and is generally much more sensitive to the presence of any foreign and/or non-homogeneous materials. The presence of patches of materials with significantly different physical characteristics in different spots in a packaging material web can inhibit homogeneous stretching, and can cause the formation of holes and/or film breaks and consequently inhibit the use of such packaging material in many stretch wrapping applications.

SUMMARY OF THE INVENTION

The invention addresses these and other problems associated with the art by providing a method, apparatus and program product that utilize various approaches for adapting stretch wrapping to accommodate lower quality packaging materials such as packaging materials including post-industrial and/or post-consumer recycled content. Some embodiments, for example, may heat a web of packaging material with substantial amounts of recycled content, prior to or during pre-stretching, while some embodiments may utilize multiple pre-stretch zones and/or reduce surface adhesion of one or more pre-stretch rollers used by a load wrapping apparatus.

Therefore, consistent with one aspect of the invention, a method of controlling a load wrapping apparatus of the type configured to wrap a load with packaging material, dispensed from a packaging material dispenser through relative rotation between the packaging material dispenser and the load may include conveying a web of the packaging material through a pre-stretch assembly of the packaging material dispenser to pre-stretch the web of packaging material prior to dispensing the packaging material to the load, and heating the web of packaging material prior to or while conveying the web through the pre-stretch assembly to reduce the pre-stretch force applied to the web.

In some embodiments, heating the web of packaging material includes heating the web of packaging material with convective heat. Also, in some embodiments, the web of packaging material is drawn from a roll of packaging material, and heating the web of packaging material includes heating the roll of packaging material. Further, in some embodiments, heating the roll of packaging material includes heating the roll of packaging material within a heated enclosure. In some embodiments, the heated enclosure is insulated and includes a slot through which the web of packaging material projects. In addition, some embodiments may also include heating the heated enclosure with a resistive heating element.

In some embodiments, the heated enclosure is a first heated enclosure operably coupled to the packaging material dispenser, and the method further includes pre-heating the roll of packaging material in a second heated enclosure. In addition, in some embodiments, the second heated enclosure is configured to heat multiple rolls of packaging material. Moreover, in some embodiments, pre-heating the roll of packaging material in the second heated enclosure heats the roll of packaging material from room temperature to an elevated temperature.

In some embodiments, heating the web of packaging material includes directing heated air onto the web of packaging material. Moreover, in some embodiments, directing heated air onto the web of packaging material is performed by one or more nozzles that face the web of packaging material. In some embodiments, the one or more nozzles are in fluid communication with a heated enclosure within which a roll of the packaging material is held at an elevated temperature. Some embodiments may also include controlling a flow of the heated air based upon a dispensing rate of the packaging material dispenser.

In addition, in some embodiments, directing heated air onto the web of packaging material includes directing heated air on a portion of the web of packaging material upstream of the pre-stretch assembly. In some embodiments, directing heated air onto the web of packaging material includes directing heated air on a portion of the web of packaging material within of the pre-stretch assembly. Moreover, in some embodiments, directing heated air onto the web of packaging material includes directing heated air on a first portion of the web of packaging material upstream of the pre-stretch assembly and directing heated air on a second portion of the web of packaging material within of the pre-stretch assembly.

Also, in some embodiments, the pre-stretch assembly includes multiple zones that each pre-stretch the web of packaging material by a predetermined amount. In some embodiments, the pre-stretch assembly includes a dispensing roller having a surface with reduced surface adhesion. In addition, in some embodiments, the web of packaging material includes recycled content.

Consistent with another aspect of the invention, a method of controlling a load wrapping apparatus of the type configured to wrap a load with packaging material containing recycled content and dispensed from a packaging material dispenser through relative rotation between the packaging material dispenser and the load may include conveying a web of the packaging material through a first zone of a pre-stretch assembly of the packaging material dispenser to pre-stretch the web of packaging material a first amount that is below a tear strength of the web of packaging material prior to dispensing the packaging material to the load, and conveying the web of the packaging material through a second zone of the pre-stretch assembly to pre-stretch the web of packaging material a second amount that is below the tear strength of the web of packaging material prior to dispensing the packaging material to the load.

In addition, some embodiments may further include heating the web of packaging material prior to or while conveying the web through the pre-stretch assembly to reduce a pre-stretch force applied to the web.

Other embodiments may include a load wrapping apparatus or a program product configured to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Embodiments consistent with the invention may adapt a stretch wrapping process for use with lower quality packaging materials, and in particular, packaging materials incorporating recycled content. Prior to a further discussion of these techniques, however, a brief discussion of various types of wrapping apparatus within which the various techniques disclosed herein may be implemented is provided.

Wrapping Apparatus Configurations

Figure 1:
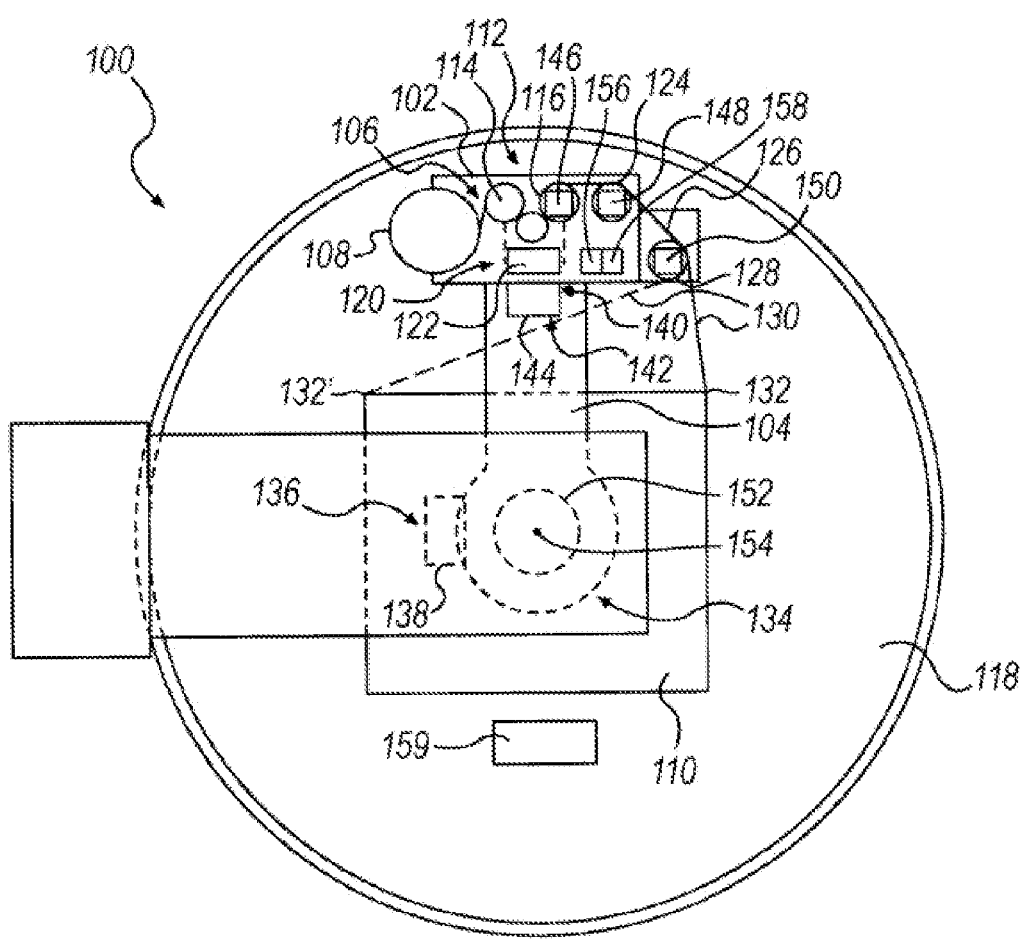
FIG. 1 shows a top view of a rotating arm-type wrapping apparatus consistent with the invention.

Various wrapping apparatus configurations may be used in various embodiments of the invention. For example, FIG. 1 illustrates a rotating arm-type wrapping apparatus 100, which includes a roll carriage or elevator 102 mounted on a rotating arm 104. Roll carriage 102 may include a packaging material dispenser 106. Packaging material dispenser 106 may be configured to dispense packaging material 108 as rotating arm 104 rotates relative to a load 110 to be wrapped. In an example embodiment, packaging material dispenser 106 may be configured to dispense stretch wrap packaging material. As used herein, stretch wrap packaging material is defined as material having a high yield coefficient to allow the material a large amount of stretch during wrapping. However, it is possible that the apparatuses and methods disclosed herein may be practiced with packaging material that will not be pre-stretched prior to application to the load. Examples of such packaging material include netting, strapping, banding, tape, etc. The invention is therefore not limited to use with stretch wrap packaging material. In addition, as used herein, the terms "packaging material," "web," "film," "film web," and "packaging material web" may be used interchangeably. Moreover, the breakage of any of the aforementioned types of packaging materials will hereinafter be referred to as "film breaks," so the term should not be interpreted to imply that film breaks refer only to breakages occurring in film-type packaging material webs.

Packaging material dispenser 106 may include a pre-stretch assembly 112 configured to pre-stretch packaging material before it is applied to load 110 if pre-stretching is desired, or to dispense packaging material to load 110 without pre-stretching. Pre-stretch assembly 112 may include at least one packaging material dispensing roller, including, for example, an upstream dispensing roller 114 and a downstream dispensing roller 116. It is contemplated that pre-stretch assembly 112 may include various configurations and numbers of pre-stretch rollers, drive or driven roller and idle rollers without departing from the spirit and scope of the invention.

The terms "upstream" and "downstream," as used in this application, are intended to define positions and movement relative to the direction of flow of packaging material 108 as it moves from packaging material dispenser 106 to load 110. Movement of an object toward packaging material dispenser 106, away from load 110, and thus, against the direction of flow of packaging material 108, may be defined as "upstream." Similarly, movement of an object away from packaging material dispenser 106, toward load 110, and thus, with the flow of packaging material 108, may be defined as "downstream." Also, positions relative to load 110 (or a load support surface 118) and packaging material dispenser 106 may be described relative to the direction of packaging material flow. For example, when two pre-stretch rollers are present, the pre-stretch roller closer to packaging material dispenser 106 may be characterized as the "upstream" roller and the pre-stretch roller closer to load 110 (or load support 118) and further from packaging material dispenser 106 may be characterized as the "downstream" roller.

A packaging material drive system 120, including, for example, an electric motor 122, may be used to drive dispensing rollers 114 and 116. For example, electric motor 122 may rotate downstream dispensing roller 116. Downstream dispensing roller 116 may be operatively coupled to upstream dispensing roller 114 by a chain and sprocket assembly, such that upstream dispensing roller 114 may be driven in rotation by downstream dispensing roller 116. Other connections may be used to drive upstream roller 114 or, alternatively, a separate drive (not shown) may be provided to drive upstream roller 114. Moreover, in some embodiments the roll of packaging material 108 may be undriven and may rotate freely, while in other embodiments the roll may be driven, e.g., by biasing a surface of the roll against upstream dispensing roller 114 or another driven roller, or by driving the roll directly.

Downstream of downstream dispensing roller 116 may be provided one or more idle rollers 124, 126 that redirect the web of packaging material, with the most downstream idle roller 126 effectively providing an exit point 128 from packaging material dispenser 102, such that a portion 130 of packaging material 108 extends between exit point 128 and a contact point 132 where the packaging material engages load 110 (or alternatively contact point 132' if load 110 is rotated in a counter-clockwise direction).

Wrapping apparatus 100 also includes a relative rotation assembly 134 configured to rotate rotating arm 104, and thus, packaging material dispenser 106 mounted thereon, relative to load 110 as load 110 is supported on load support surface 118. Relative rotation assembly 134 may include a rotational drive system 136, including, for example, an electric motor 138. It is contemplated that rotational drive system 136 and packaging material drive system 120 may run independently of one another. Thus, rotation of dispensing rollers 114 and 116 may be independent of the relative rotation of packaging material dispenser 106 relative to load 110. This independence allows a length of packaging material 108 to be dispensed per a portion of relative revolution that is neither predetermined nor constant. Rather, the length may be adjusted periodically or continuously based on changing conditions. In other embodiments, however, packaging material dispenser 106 may be driven proportionally to the relative rotation, or alternatively, tension in the packaging material extending between the packaging material dispenser and the load may be used to drive the packaging material dispenser.

Wrapping apparatus 100 may further include a lift assembly 140. Lift assembly 140 may be powered by a lift drive system 142, including, for example, an electric motor 144, that may be configured to move roll carriage 102 vertically relative to load 110. Lift drive system 142 may drive roll carriage 102, and thus packaging material dispenser 106, generally in a direction parallel to an axis of rotation between the packaging material dispenser 106 and load 110 and load support surface 118. For example, for wrapping apparatus 100, lift drive system 142 may drive roll carriage 102 and packaging material dispenser 106 upwards and downwards vertically on rotating arm 104 while roll carriage 102 and packaging material dispenser 106 are rotated about load 110 by rotational drive system 136, to wrap packaging material spirally about load 110.

One or more of downstream dispensing roller 116, idle roller 124 and idle roller 126 may include a corresponding sensor 146, 148, 150 to monitor rotation of the respective roller. In particular, rollers 116, 124 and/or 126, and/or packaging material 108 dispensed thereby, may be used to monitor a dispense rate of packaging material dispenser 106, e.g., by monitoring the rotational speed of rollers 116, 124 and/or 126, the number of rotations undergone by such rollers, the amount and/or speed of packaging material dispensed by such rollers, and/or one or more performance parameters indicative of the operating state of packaging material drive system 120, including, for example, a speed of packaging material drive system 120. The monitored characteristics may also provide an indication of the amount of packaging material 108 being dispensed and wrapped onto load 110. In addition, in some embodiments a sensor, e.g., sensor 148 or 150, may be used to detect a break in the packaging material.

Wrapping apparatus also includes an angle sensor 152 for determining an angular relationship between load 110 and packaging material dispenser 106 about a center of rotation 154. Angle sensor 152 may be implemented, for example, as a rotary encoder, or alternatively, using any number of alternate sensors or sensor arrays capable of providing an indication of the angular relationship and distinguishing from among multiple angles throughout the relative rotation, e.g., an array of proximity switches, optical encoders, magnetic encoders, electrical sensors, mechanical sensors, photodetectors, motion sensors, etc. The angular relationship may be represented in some embodiments in terms of degrees or fractions of degrees, while in other embodiments a lower resolution may be adequate. It will also be appreciated that an angle sensor consistent with the invention may also be disposed in other locations on wrapping apparatus 100, e.g., about the periphery or mounted on arm 104 or roll carriage 102. In addition, in some embodiments angular relationship may be represented and/or measured in units of time, based upon a known rotational speed of the load relative to the packaging material dispenser, from which a time to complete a full revolution may be derived such that segments of the revolution time would correspond to particular angular relationships. Other sensors may also be used to determine the height and/or other dimensions of a load, among other information.

Additional sensors, such as a load distance sensor 156 and/or a film angle sensor 158, may also be provided on wrapping apparatus 100. Load distance sensor 156 may be used to measure a distance from a reference point to a surface of load 110 as the load rotates relative to packaging material dispenser 106 and thereby determine a cross-sectional dimension of the load at a predetermined angular position relative to the packaging material dispenser. In one embodiment, load distance sensor 156 measures distance along a radial from center of rotation 154, and based on the known, fixed distance between the sensor and the center of rotation, the dimension of the load may be determined by subtracting the sensed distance from this fixed distance. Sensor 156 may be implemented using various types of distance sensors, e.g., a photoeye, proximity detector, laser distance measurer, ultrasonic distance measurer, electronic rangefinder, and/or any other suitable distance measuring device. Exemplary distance measuring devices may include, for example, an IFM Effector 01 D100 and a Sick UM30-213118 (6036923).

Film angle sensor 158 may be used to determine a film angle for portion 130 of packaging material 108, which may be relative, for example, to a radial (not shown in FIG. 1) extending from center of rotation 154 to exit point 128 (although other reference lines may be used in the alternative). In one embodiment, film angle sensor 158 may be implemented using a distance sensor, e.g., a photoeye, proximity detector, laser distance measurer, ultrasonic distance measurer, electronic rangefinder, and/or any other suitable distance measuring device. In one embodiment, an IFM Effector 01 D100 and a Sick UM30-213118 (6036923) may be used for film angle sensor 158. In other embodiments, film angle sensor 158 may be implemented mechanically, e.g., using a cantilevered or rockered follower arm having a free end that rides along the surface of portion 130 of packaging material 108 such that movement of the follower arm tracks movement of the packaging material. In still other embodiments, a film angle sensor may be implemented by a force sensor that senses force changes resulting from movement of portion 130 through a range of film angles, or a sensor array (e.g., an image sensor) that is positioned above or below the plane of portion 130 to sense an edge of the packaging material.

In other embodiments, some or all of sensors 146, 148, 150, 152, 156, 158 may be omitted.

Wrapping apparatus 100 may also include additional components used in connection with other aspects of a wrapping operation. For example, a clamping device 159 may be used to grip the leading end of packaging material 108 between wrap operations or cycles. In addition, a conveyor (not shown) may be used to convey loads to and from wrapping apparatus 100. Other components commonly used on a wrapping apparatus will be appreciated by one of ordinary skill in the art having the benefit of the instant disclosure.

Figure 2:
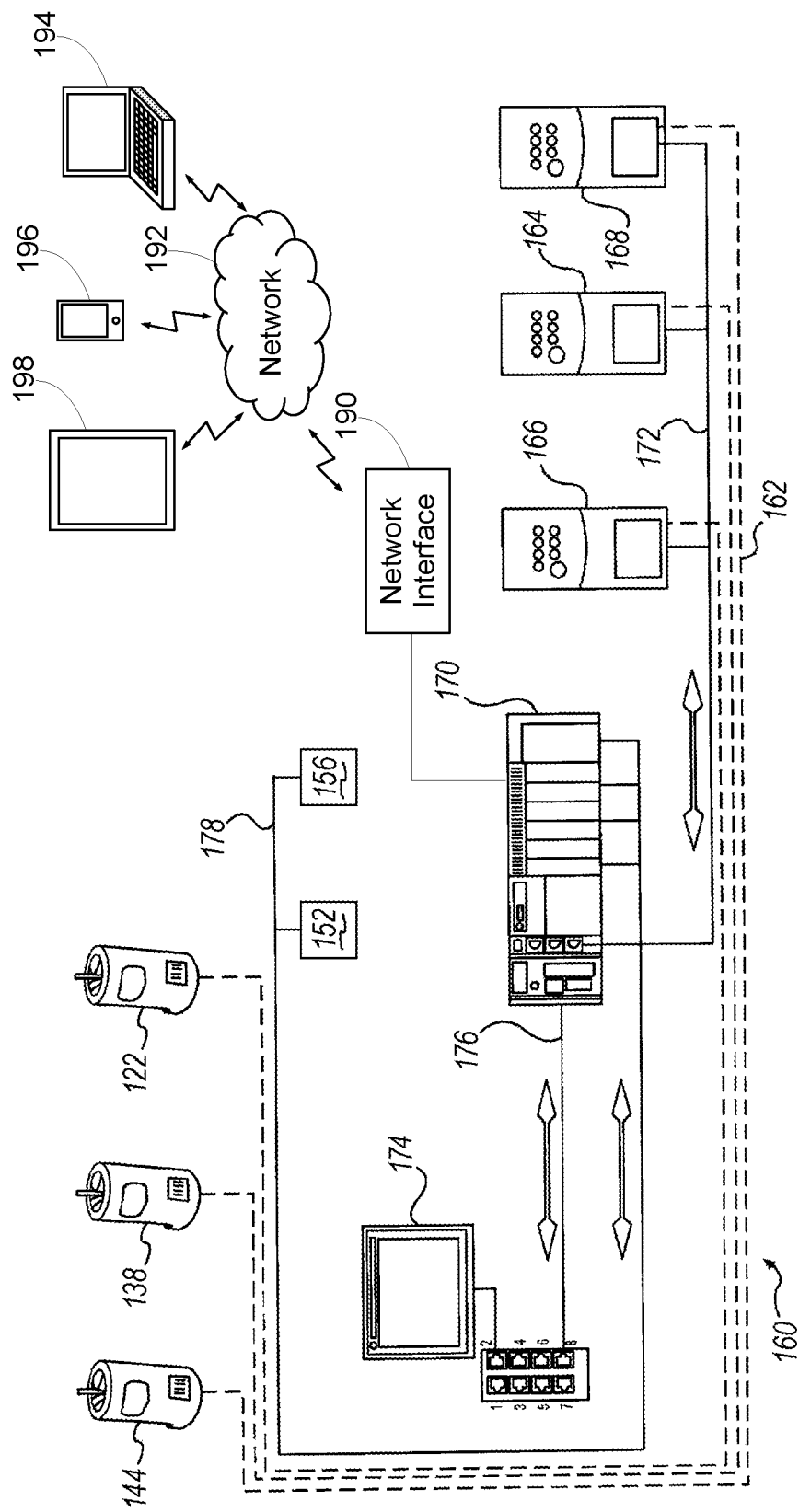
FIG. 2 is a schematic view of an example control system for use in the apparatus of FIG. 1.

An example schematic of a control system 160 for wrapping apparatus 100 is shown in FIG. 2. Motor 122 of packaging material drive system 120, motor 138 of rotational drive system 136, and motor 144 of lift drive system 142 may communicate through one or more data links 162 with a rotational drive variable frequency drive ("VFD") 164, a packaging material drive VFD 166, and a lift drive VFD 168, respectively. Rotational drive VFD 164, packaging material drive VFD 166, and lift drive VFD 168 may communicate with controller 170 through a data link 172. It should be understood that rotational drive VFD 164, packaging material drive VFD 166, and lift drive VFD 168 may produce outputs to controller 170 that controller 170 may use as indicators of rotational movement.

Controller 170 in the embodiment illustrated in FIG. 2 is a local controller that is physically co-located with the packaging material drive system 120, rotational drive system 136 and lift drive system 142. Controller 170 may include hardware components and/or software program code that allow it to receive, process, and transmit data. It is contemplated that controller 170 may be implemented as a programmable logic controller (PLC), or may otherwise operate similar to a processor in a computer system. Controller 170 may communicate with an operator interface 174 via a data link 176. Operator interface 174 may include a display or screen and controls that provide an operator with a way to monitor, program, and operate wrapping apparatus 100. For example, an operator may use operator interface 174 to enter or change predetermined and/or desired settings and values, or to start, stop, or pause the wrap operation. Controller 170 may also communicate with one or more sensors, e.g., sensors 152 and 156, among others, through a data link 178 to allow controller 170 to receive feedback and/or performance-related data during wrapping, such as roller and/or drive rotation speeds, load dimensional data, etc. It is contemplated that data links 162, 172, 176, and 178 may include any suitable wired and/or wireless communications media known in the art.

For the purposes of the invention, controller 170 may represent practically any type of computer, computer system, controller, logic controller, or other programmable electronic device, and may in some embodiments be implemented using one or more networked computers or other electronic devices, whether located locally or remotely with respect to the various drive systems 120, 136 and 142 of wrapping apparatus 100.

Controller 170 typically includes a central processing unit including at least one microprocessor coupled to a memory, which may represent the random access memory (RAM) devices comprising the main storage of controller 170, as well as any supplemental levels of memory, e.g., cache memories, non-volatile or backup memories (e.g., programmable or flash memories), read-only memories, etc. In addition, the memory may be considered to include memory storage physically located elsewhere in controller 170, e.g., any cache memory in a processor in CPU 52, as well as any storage capacity used as a virtual memory, e.g., as stored on a mass storage device or on another computer or electronic device coupled to controller 170. Controller 170 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 170 may include an interface 190 with one or more networks 192 (e.g., a LAN, a WAN, a wireless network, and/or the Internet, among others) to permit the communication of information to the components in wrapping apparatus 100 as well as with other computers and electronic devices, e.g. computers such as a desktop computer or laptop computer 194, mobile devices such as a mobile phone 196 or tablet 198, multi-user computers such as servers or cloud resources, etc. Controller 170 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 170, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 170. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In the discussion hereinafter, the hardware and software used to control wrapping apparatus 100 is assumed to be incorporated wholly within components that are local to wrapping apparatus 100 illustrated in FIGS. 1-2, e.g., within components 162-178 described above. It will be appreciated, however, that in other embodiments, at least a portion of the functionality incorporated into a wrapping apparatus may be implemented in hardware and/or software that is external to the aforementioned components. For example, in some embodiments, some user interaction may be performed using an external device such as a networked computer or mobile device, with the external device converting user or other input into control variables that are used to control a wrapping operation. In other embodiments, user interaction may be implemented using a web-type interface, and the conversion of user input may be performed by a server or a local controller for the wrapping apparatus, and thus external to a networked computer or mobile device. In still other embodiments, a central server may be coupled to multiple wrapping stations to control the wrapping of loads at the different stations. As such, the operations of receiving user or other input, converting the input into control variables for controlling a wrap operation, initiating and implementing a wrap operation based upon the control variables, providing feedback to a user, etc., may be implemented by various local and/or remote components and combinations thereof in different embodiments. In some embodiments, for example, an external device such as a mobile device, a networked computer, a server, a cloud service, etc. may generate a wrap model that defines the control variables for controlling a wrap operation for a particular load, and that wrap model may then be communicated to a wrapping apparatus and used by a controller therefor to control a dispense rate during a wrap operation. As such, the invention is not limited to the particular allocation of functionality described herein.

Figure 3:
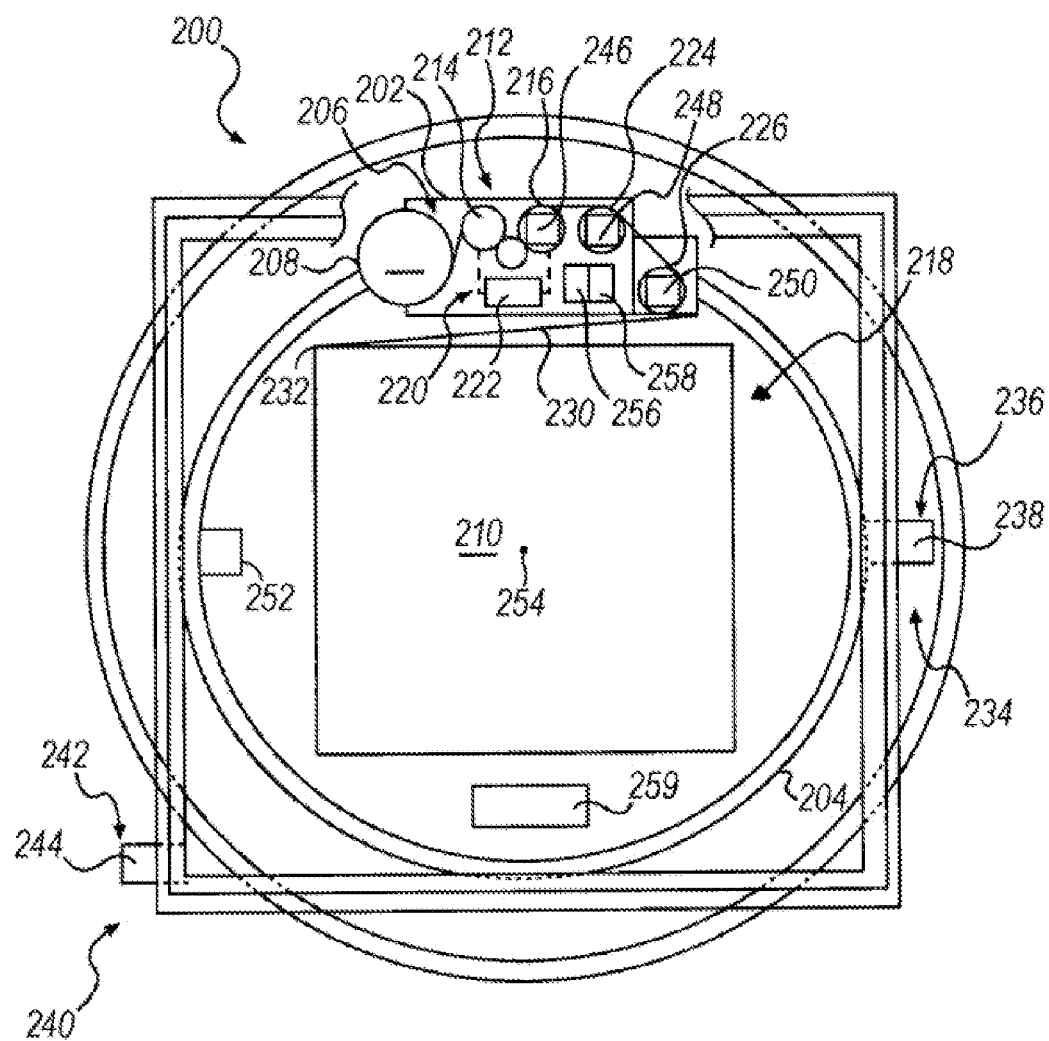
FIG. 3 shows a top view of a rotating ring-type wrapping apparatus consistent with the invention.

Now turning to FIG. 3, a rotating ring-type wrapping apparatus 200 is illustrated. Wrapping apparatus 200 may include elements similar to those shown in relation to wrapping apparatus 100 of FIG. 1, including, for example, a roll carriage or elevator 202 including a packaging material dispenser 206 configured to dispense packaging material 208 during relative rotation between roll carriage 202 and a load 210 disposed on a load support 218. However, a rotating ring 204 is used in wrapping apparatus 200 in place of rotating arm 104 of wrapping apparatus 100. In many other respects, however, wrapping apparatus 200 may operate in a manner similar to that described above with respect to wrapping apparatus 100.

Packaging material dispenser 206 may include a pre-stretch assembly 212 including an upstream dispensing roller 214 and a downstream dispensing roller 216, and a packaging material drive system 220, including, for example, an electric motor 222, may be used to drive dispensing rollers 214 and 216. Downstream of downstream dispensing roller 216 may be provided one or more idle rollers 224, 226, with the most downstream idle roller 226 effectively providing an exit point 228 from packaging material dispenser 206, such that a portion 230 of packaging material 208 extends between exit point 228 and a contact point 232 where the packaging material engages load 210.

Wrapping apparatus 200 also includes a relative rotation assembly 234 configured to rotate rotating ring 204, and thus, packaging material dispenser 206 mounted thereon, relative to load 210 as load 210 is supported on load support surface 218. Relative rotation assembly 234 may include a rotational drive system 236, including, for example, an electric motor 238. Wrapping apparatus 200 may further include a lift assembly 240, which may be powered by a lift drive system 242, including, for example, an electric motor 244, that may be configured to move rotating ring 204 and roll carriage 202 vertically relative to load 210.

In addition, similar to wrapping apparatus 100, wrapping apparatus 200 may include sensors 246, 248, 250 on one or more of downstream dispensing roller 216, idle roller 224 and idle roller 226. Furthermore, an angle sensor 252 may be provided for determining an angular relationship between load 210 and packaging material dispenser 206 about a center of rotation 254, and in some embodiments, one or both of a load distance sensor 256 and a film angle sensor 258 may also be provided. Sensor 252 may be positioned proximate center of rotation 254, or alternatively, may be positioned at other locations, such as proximate rotating ring 204. Wrapping apparatus 200 may also include additional components used in connection with other aspects of a wrapping operation, e.g., a clamping device 259 may be used to grip the leading end of packaging material 208 between cycles.

Figure 4:
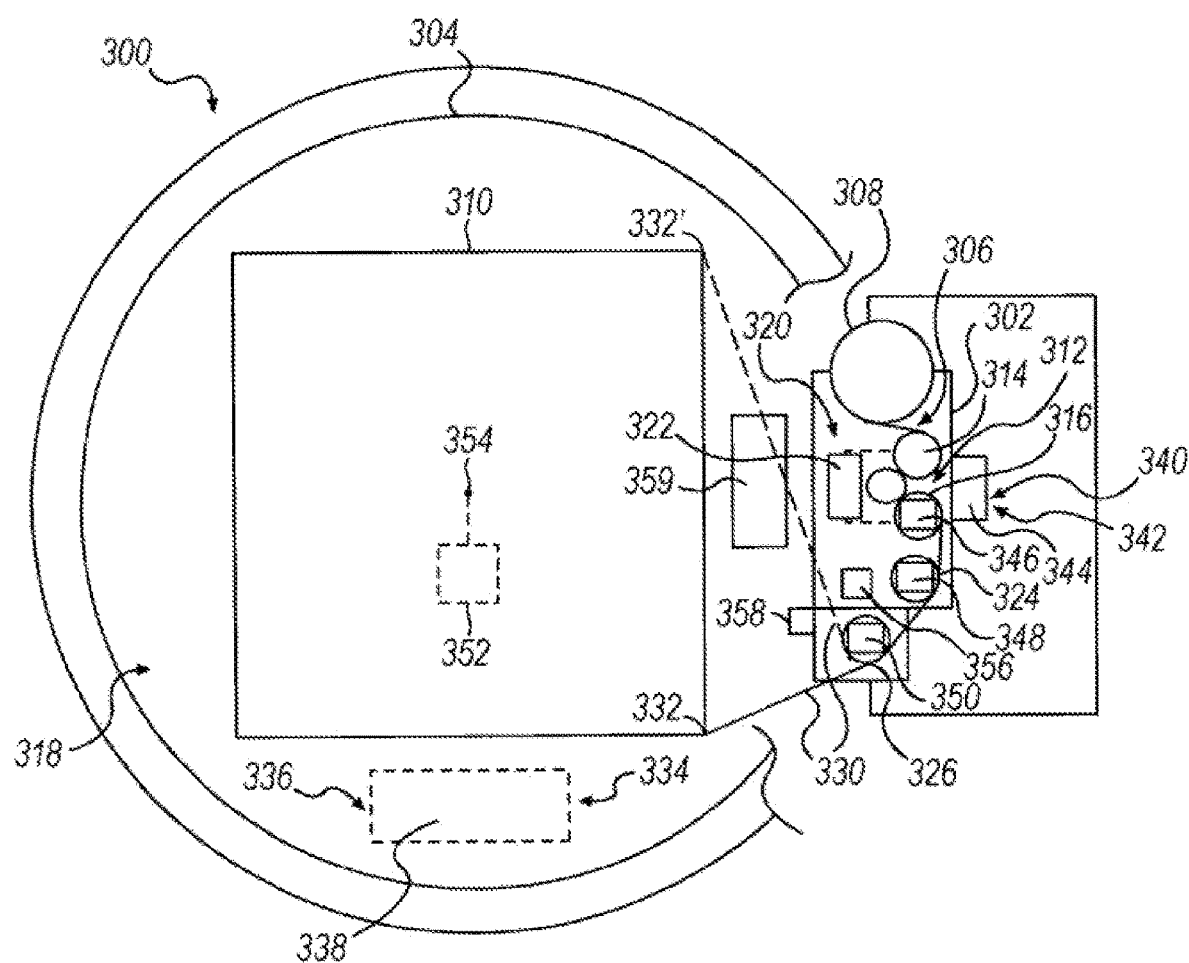
FIG. 4 shows a top view of a turntable-type wrapping apparatus consistent with the invention.

FIG. 4 likewise shows a turntable-type wrapping apparatus 300, which may also include elements similar to those shown in relation to wrapping apparatus 100 of FIG. 1. However, instead of a roll carriage or elevator 102 that rotates around a fixed load 110 using a rotating arm 104, as in FIG. 1, wrapping apparatus 300 includes a rotating turntable 304 functioning as a load support 318 and configured to rotate load 310 about a center of rotation 354 (through which projects an axis of rotation that is perpendicular to the view illustrated in FIG. 4) while a packaging material dispenser 306 disposed on a roll carriage or elevator 302 remains in a fixed location about center of rotation 354 while dispensing packaging material 308. In many other respects, however, wrapping apparatus 300 may operate in a manner similar to that described above with respect to wrapping apparatus 100.

Packaging material dispenser 306 may include a pre-stretch assembly 312 including an upstream dispensing roller 314 and a downstream dispensing roller 316, and a packaging material drive system 320, including, for example, an electric motor 322, may be used to drive dispensing rollers 314 and 316, and downstream of downstream dispensing roller 316 may be provided one or more idle rollers 324, 326, with the most downstream idle roller 326 effectively providing an exit point 328 from packaging material dispenser 306, such that a portion 330 of packaging material 308 extends between exit point 328 and a contact point 332 (or alternatively contact point 332' if load 310 is rotated in a counter-clockwise direction) where the packaging material engages load 310.

Wrapping apparatus 300 also includes a relative rotation assembly 334 configured to rotate turntable 304, and thus, load 310 supported thereon, relative to packaging material dispenser 306. Relative rotation assembly 334 may include a rotational drive system 336, including, for example, an electric motor 338. Wrapping apparatus 300 may further include a lift assembly 340, which may be powered by a lift drive system 342, including, for example, an electric motor 344, that may be configured to move roll carriage or elevator 302 and packaging material dispenser 306 vertically relative to load 310.

In addition, similar to wrapping apparatus 100, wrapping apparatus 300 may include sensors 346, 348, 350 on one or more of downstream dispensing roller 316, idle roller 324 and idle roller 326. Furthermore, an angle sensor 352 may be provided for determining an angular relationship between load 310 and packaging material dispenser 306 about a center of rotation 354, and in some embodiments, one or both of a load distance sensor 356 and a film angle sensor 358 may also be provided. Sensor 352 may be positioned proximate center of rotation 354, or alternatively, may be positioned at other locations, such as proximate the edge of turntable 304. Wrapping apparatus 300 may also include additional components used in connection with other aspects of a wrapping operation, e.g., a clamping device 359 may be used to grip the leading end of packaging material 308 between cycles.

Each of wrapping apparatus 200 of FIG. 3 and wrapping apparatus 300 of FIG. 4 may also include a controller (not shown) similar to controller 170 of FIG. 2, and receive signals from one or more of the aforementioned sensors and control packaging material drive system 220, 320 during relative rotation between load 210, 310 and packaging material dispenser 206, 306.

Those skilled in the art will recognize that the example environments illustrated in FIGS. 1-4 are not intended to limit the present invention. Indeed, those skilled in the art will recognize that other alternative environments may be used without departing from the scope of the invention.

Stretch Wrapping Utilizing Packaging Material with Recycled Content

As noted above, there is an increasing demand for incorporating recycled content, e.g., post-consumer recycled (PCR) and/or post-industrial recycled (PIR) materials, into the packaging materials utilized by stretch wrapping machines, e.g., stretch film. Such post-consumer or post-industrial materials, however, may incorporate far more impurities than the virgin material utilized for most commercial packaging material.

Small amounts of "trim" and "reject" materials from the extrusion and winding process of the original manufacturer have been successfully reinserted into stretch film. However most of the focus on higher levels (20-50%) of this PIR has been on "hand wrap" materials that are manually applied to a load by an operator. These higher levels of PIR have not been typically used for "machine" materials due to the significant reductions in physical characteristics necessary for successful application. The amounts of PIR are generally significantly limited due the very low levels of such waste generated in the production of stretch film.

Social and legislative focus, however, is primarily on PCR materials, and there is pressure to include up to 30% PCR materials into stretch wrap packaging material. These materials are generated after the actual use of the stretch film and must be collected from the broad market of stretch wrap receivers. Unfortunately, these packaging materials get polluted with other materials such as labels, adhesive, and dissimilar polyethylene materials such as top sheet materials and shrink overwrap materials. The more serious and difficult process will be incurred when attempting to reintroduce any substantial quantity of pellets of cleaned and recycled PCR film returned from actual use. PCR materials are much less homogeneous than the virgin resin and create very significant blotches and patches of gel-like contaminations into the packaging material. They also can substantially increase the forces required to pre-stretch the packaging material, and generally leading to frequent and random unacceptable film breaks.

Embodiments consistent with the invention attempt to address the aforementioned shortcomings of lower quality packaging material such as packaging material incorporating recycled content by adapting a stretch wrapping process to accommodate the contaminated and mixed density of packaging material produced with significant quantities of recycled content, thereby mitigating the differential physical characteristics of recycled plastic materials and their impact on the process of stretching packaging material. The approaches discussed herein, for example, may be used with packaging material having substantial amounts of recycled content, which in some embodiments may be packaging material having greater than about 10% of post-industrial and/or post-consumer recycled content. Some embodiments may be used with packaging material having greater than about 20% or 30% recycled content, or even more in some instances. Some embodiments, for example, may be used with packaging material having up to about 30% recycled content.

In some embodiments of the invention, for example, heat may be applied to a packaging material prior to pre-stretching the packaging material to effectively lower the pre-stretch force relative to the composite tear strength of the packaging material. Desirably, the packaging material is heated to a temperature below its "glass transition" temperature point, which is a temperature where a web of packaging material loses most of its pre-stretch force as a continuous web. With many of the polyethylene materials used in packaging material, the glass transition temperature will generally be at or above around 180 degrees F.

While heat may be applied in some embodiments via conduction (e.g., using heated rollers) or radiation (e.g., using infrared heating elements), in other embodiments convection may be used to heat a packaging material. Heated rollers, for example, generally must be at a high enough temperature to quickly heat the packaging material as the packaging material generally is in contact with each roller a very small amount of time during a wrapping operation. However, when the wrapping operation is complete and the machine comes to a stop, the rollers, if left in contact with the film, are generally hot enough to melt the packaging material and thereby cause severe weakness and sticking to the rollers between wrapping operations, thus the rollers generally must be cooled quickly once a machine is stopped in order to protect the packaging material from overheating. Infrared heating elements, on the other hand, are generally much easier to heat up and cool down quickly; nonetheless, such heating elements generally operate at a very high temperature so they also can be prone to overheating the packaging material, and any contact between a heating element and any packaging material (e.g., in response to a film break) could become a fire hazard.

In some embodiments, convection may be implemented by utilizing a heated enclosure, or "hot box," to store at least one packaging material packaging material roll at a predetermined temperature that is below the glass transition temperature, e.g., between about 120 and about 160 degrees F. in some embodiments. This packaging material roll may then be transferred into another heated enclosure mounted on a packaging material dispenser and including a gap for feeding the packaging material to the pre-stretch rollers of the packaging material dispenser. In addition, pre-stretch may be disabled or reduced at the start and/or end of a wrapping operation, e.g., so that the wrapping operation could be initiated with the "cold" packaging material outside of the heated enclosure dispensed at no pre-stretch or at a reduced pre-stretch until the preheated packaging material had exited the heated enclosure and wound through the pre-stretch rollers, at which time normal pre-stretch could be reengaged.

Furthermore, in addition to or in lieu of the use of a heated enclosure, in some embodiments packaging material may be pre-heated using one or more nozzles dispensing hot air onto the packaging material web upstream of and/or within the pre-stretch assembly of the packaging material dispenser. Further, in some embodiments, the temperature and/or rate of air flow may be regulated to operate proportionally with the passage of packaging material through the packaging material dispenser. In some embodiments, for example, a remotely placed insulated electric resistance based heated enclosure may be adapted with a blower in fluid communication via tubing to one or more nozzles disposed proximate the packaging material web, and which can be rapidly turned off when the packaging material dispenser slows or stops. The heated enclosure may be controlled to a temperature able to heat the air sufficiently to substantially heat the packaging material while controlling the temperature to below the glass transition point. The temperature of the air may also be regulated to achieve a desired packaging material temperature accommodating rapid change as the speed of the packaging material dispenser is started and stopped. It is believed, for example, that heating the packaging material may lower pre-stretch forces substantially below the tear strength of the packaging material, thus protecting the impurities from causing major holes and tears in the packaging material during pre-stretch.

Another approach would be to use a heated upstream roller that was removed from the film path when the load wrapping apparatus was not running. Care would need to be taken, however, to guard this "hot" roller from an operator during film threading.

Yet another approach that may be utilized in lieu of or in addition to heat is to utilize multiple pre-stretch zones rather than attempt to pre-stretch the packaging material in one zone. By doing so, the stress on the packaging material web is generally reduced, which permits the differential elements within the packaging material web to accommodate their different stress strain rates. While different combinations of pre-stretching may be utilized in different embodiments, in one example embodiment two pre-stretch zones of equal magnitude may be combined, e.g., such that 300% overall pre-stretch may be accomplished using two 150% pre-stretch zones.

Still another approach that may be utilized in lieu of or in addition to any of the other aforementioned approaches is to utilize pre-stretch rollers having surfaces providing a reduced surface adhesion with the packaging material to reduce the potential tear and separation hazards of the pre-stretch rollers from the substantially softened packaging material web passage over the rollers. Smoother and more polished rollers, e.g., more similar to the chill rollers used in packaging material production, may be used in some embodiments, and in some embodiments, circumferential ribs and other adhesion reduction structures may also be used to enhance smooth separation of the packaging material as it leaves one pre-stretch roller or intermediate idle roller in a pre-stretch assembly. Other surface treatments, e.g., painting, chrome plating, etc., may be used in other embodiments. Further, various surface materials, e.g., stainless steel, may be used in some embodiments. Given that heated packaging material has increased tackiness, reduction in surface adhesion reduces the likelihood of the packaging material sticking on a roller or increasing its dwell time on a roller as the packaging material is conveyed across the roller.

A further approach that may be utilized in lieu of or in addition to any of the other aforementioned approaches is to separate the pre-stretch rollers to permit a longer span of packaging material between the two pre-stretch rollers and thereby reduce transverse direction strain and lower pre-stretch force.

Figure 5:
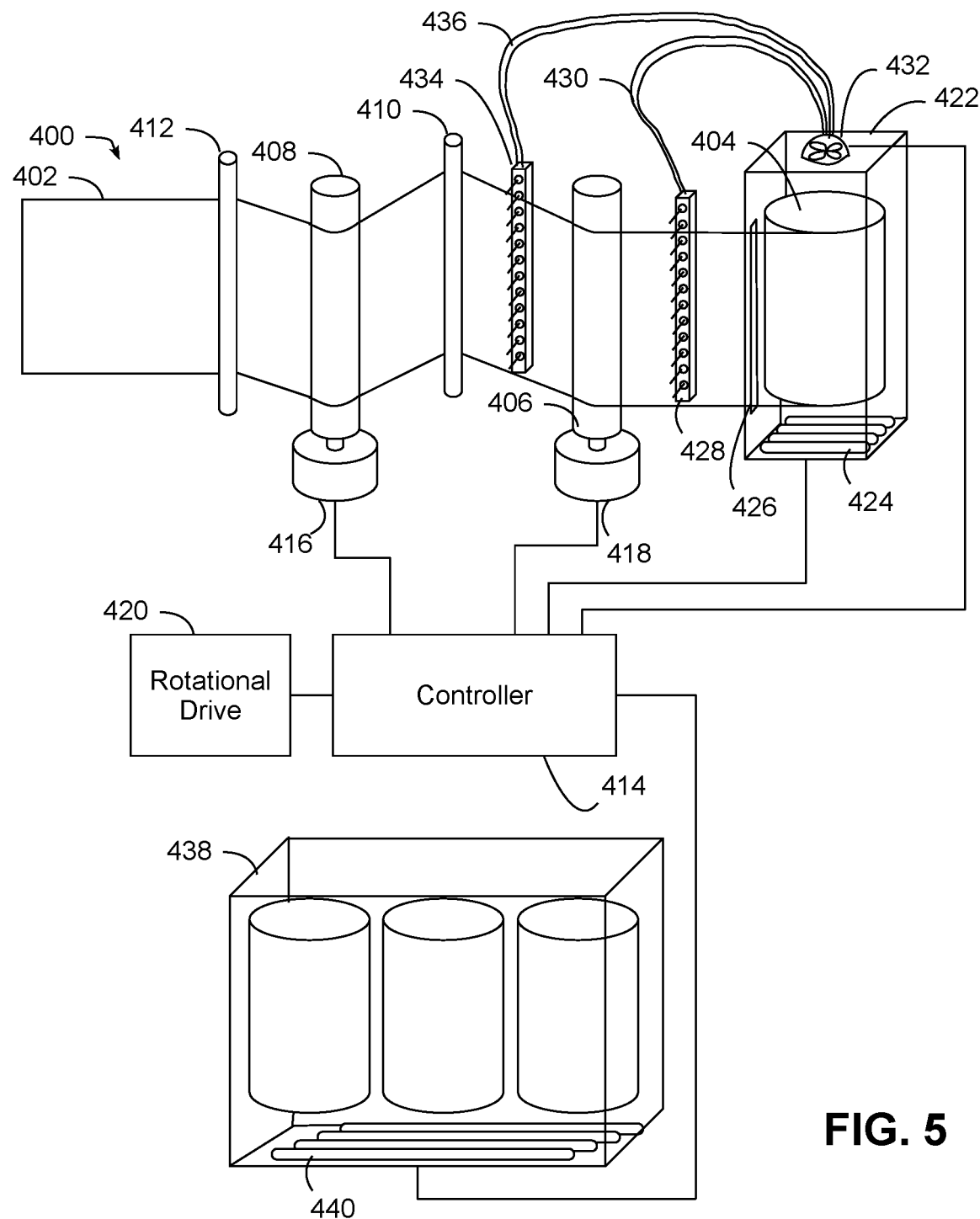
FIG. 5 functionally illustrates a load wrapping apparatus suitable for utilizing packaging material with recycled content consistent with some embodiments of the invention.

Now turning to FIG. 5, this figure functionally illustrates an example load wrapping apparatus 400 consistent with some embodiments of the invention. Apparatus 400 may include a packaging material dispenser that dispenses a web of packaging material 402 from a roll 404 and past upstream and downstream dispensing rollers 406, 408 of a pre-stretch assembly, as well as between upstream and downstream idle rollers 410, 412 that are respectively disposed upstream and downstream of downstream dispensing roller 408. A controller 414 controls a dispense rate of the packaging material dispenser by controlling a packaging material drive 416 coupled to downstream dispensing roller 408. In addition, while in some embodiments dispensing rollers 406 and 408 may be mechanically coupled to one another to rotate at a fixed or adjustable ratio relative to one another to provide a fixed or adjustable pre-stretch, in other embodiments, and as illustrated in FIG. 5, dispensing roller 406 may be driven by a separate pre-stretch drive 418 that enables the pre-stretch ratio to be controlled electronically, and in some instances, dynamically during a wrap operation. In addition, while in some embodiments, roll 404 may be unpowered, in other embodiments, the roll may be driven by a drive (not shown), which in some embodiments may be configured as an electronic brake.

During a wrap operation, controller 414 may control drive 416 (as well as drive 418 if pre-stretch rollers 406, 408 are not mechanically coupled to one another) to control the dispensation of packaging material from roll 404 to a load, which when coupled with control over a rotational drive 420 that controls relative rotation between the packaging material dispenser and the load, wraps packaging material around the load in a controlled manner. It will be appreciated that additional aspects of controlling load wrapping apparatus 400, including, for example, carriage control and various sensors used to detect various aspects of a wrap operation, may also be incorporated into load wrapping apparatus 400 but are not illustrated in FIG. 5.

In the illustrated embodiment, a heated enclosure 422 is used to house packaging material roll 404, with a heating element 424 (e.g., a resistive heating element) controlled by controller 414 to maintain a temperature of about 120 to about 160 degrees F. and a slot 426 through which the packaging material web extends. Heated enclosure 422 may have suitable insulation to reduce heat loss and increase energy efficiency. In addition, an array of nozzles 428 may be provided upstream of pre-stretch rollers 406, 408 to heat the packaging material. In the illustrated embodiment, heated air from heated enclosure 422 is conveyed to nozzle array 428 via tubing 430, and a blower fan 432 is used to direct the heated air through tubing 430 and out of nozzle array 428. Blower 432 is controlled by controller 414, and may be varied in speed based upon dispense rate such that airflow is proportional to dispense rate. Controller 414 may also shut off blower 432 at the end of a wrapping operation to discontinue airflow to the packaging material web when the web is stationary.

In some embodiments, rather than blowing hot air on the web upstream of the pre-stretch rollers, an array of nozzles 434 may be positioned intermediate pre-stretch rollers 406, 408 and coupled to heated enclosure 422 via tubing 436 to heat the web within the pre-stretch assembly. In other embodiments, multiple arrays may be used to heat the web at multiple locations, and airflow to each array may be controlled individually in some embodiments (e.g., via separate blowers) to maintain appropriate heating of the web. In addition, while arrays 428, 434 are illustrated as utilizing hot air from heated enclosure 422, in other embodiments, other means of generating convective heat may be used, including separate heaters and/or blowers for each array 428, 434. Furthermore, as noted above, some embodiments may use only a heated enclosure and omit any directed hot air on the web, while other embodiments may only heat the web with directed hot air and omit any heated enclosure, so the invention is not limited to the particular embodiment illustrated in FIG. 5.

Moreover, while in some embodiments roll 404 may be heated from room temperature to the desired temperature within heated enclosure 422, in other embodiments it may be desirable to utilize a different heated enclosure, e.g., heated enclosure 438 heated by heating element 440, to pre-heat and store one or more rolls of packaging material and maintain those rolls at an elevated temperature (either the operating temperature maintained by heated enclosure 422 or another elevated temperature), and then transfer those rolls individually to heated enclosure 422 for use. By doing so, multiple rolls may be ready for use at any given time, and individual rolls may be transferred at an already-elevated temperature such that the power requirements for heated enclosure 422 are reduced. It may be desirable, in particular, to heat a roll to an operating temperature over the course of multiple hours to reduce the risk of overheating any portion of a roll and potentially causing melting of packaging material within the roll. Therefore, the heating element 424 may be limited to maintaining the temperature of the roll at a desired temperature, rather than having to heat the roll up from room temperature.

In various embodiments, heated enclosure 438 may store multiple rolls at a time, and may service multiple load wrapping apparatuses. In addition, rolls may be transferred manually between heated enclosure 422 and 438 in some embodiments, while in other embodiments automated equipment may be used to transfer rolls between the enclosures.

As also noted above, in some embodiments controller 414 may disable or reduce pre-stretch at the start of a wrapping operation (e.g., through control over drives 416 and 418) such that the packaging material that is currently external of the heated enclosure 422 and is thus not at the desired operating temperature can pass through the pre-stretch assembly with no or reduced pre-stretch.

Figure 6:
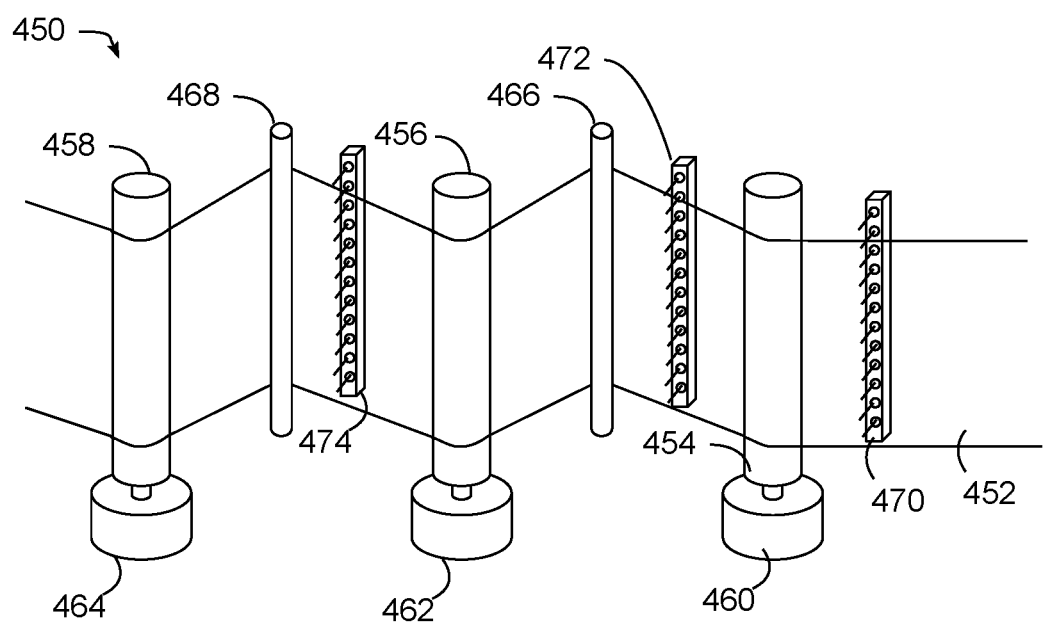
FIG. 6 functionally illustrates another load wrapping apparatus suitable for utilizing packaging material with recycled content consistent with some embodiments of the invention.

In addition, as noted above, in some embodiments it may be desirable to utilize multiple pre-stretch zones in a packaging material dispenser to maintain a pre-stretch force below a tear strength of the packaging material. FIG. 6, for example, illustrates a load wrapping apparatus 450 that includes a packaging material dispenser that dispenses a web of packaging material 452 past three dispensing rollers 454, 456, and 458 of a two stage pre-stretch assembly and driven respectively by three dispensing roller drives 460, 462, and 464, as well as between upstream and downstream idle rollers 466, 468 that are respectively disposed in each of first and second stages of the pre-stretch assembly. While any of the aforementioned convective heat approaches discussed above may be used, in this embodiment three nozzle arrays 470, 472 and 474 are used to heat the web upstream of the pre-stretch assembly as well as within each of the two stages of the pre-stretch assembly. The first stage is between dispensing rollers 454 and 456, and the amount of pre-stretch in the first stage is controlled by the relative rates of drives 460, 462. The second stage is between dispensing rollers 456 and 458, and the amount of pre-stretch in the second stage is controlled by the relative rates of drives 462, 464.

Thus, for example, if 300% of pre-stretch is desired, 150% of pre-stretch may be applied in each pre-stretch zone to achieve the same amount of pre-stretch while reducing the overall pre-stretch force applied to the packaging material in each zone. More than two zones may be used in other embodiments, as may other pre-stretch amounts within each zone.

Also in the embodiment of FIG. 6, one or more of rollers 454, 456, 458 is has a surface with a reduced surface adhesion compared to conventional pre-stretch rollers, e.g., through the use of a smoother surface and/or a surface with circumferential ribs or other suitable adhesion reduction structures. Finally, in some instances the spacing between rollers 454 and 456 and/or between rollers 456 and 458 may be increased in some embodiments to provide a longer span of packaging material between the pairs of pre-stretch rollers and thereby reduce transverse direction strain and lower pre-stretch force.

Other embodiments will be apparent to those skilled in the art from consideration of the specification and practice of the present invention. For example various combinations of convective, conductive and/or radiative heat may be used to heat packaging material in other embodiments. Therefore the invention lies in the claims set forth hereinafter.

What is claimed is:

1. A method of controlling a load wrapping apparatus of the type configured to wrap a load with a stretchable plastic packaging material that includes recycled content and that is dispensed from a packaging material dispenser through relative rotation between the packaging material dispenser and the load, the method comprising:
conveying a web of the packaging material through a pre-stretch assembly of the packaging material dispenser to pre-stretch the web of packaging material prior to dispensing the packaging material to the load; and
heating the web of packaging material prior to or while conveying the web through the pre-stretch assembly to reduce a pre-stretch force applied to the web, wherein heating the web of packaging material comprises heating the web of packaging material with convective heat, wherein the web of packaging material is drawn from a roll of packaging material, wherein heating the web of packaging material comprises heating the roll of packaging material within a heated enclosure, wherein the heated enclosure is a first heated enclosure operably coupled to the packaging material dispenser, and wherein the method further comprises pre-heating the roll of packaging material in a second heated enclosure.

2. The method of claim 1, wherein the first heated enclosure is insulated and includes a slot through which the web of packaging material projects.

3. The method of claim 1, further comprising heating the first heated enclosure with a resistive heating element.

4. The method of claim 1, wherein the second heated enclosure is configured to heat multiple rolls of packaging material.

5. The method of claim 1, wherein pre-heating the roll of packaging material in the second heated enclosure heats the roll of packaging material from room temperature to an elevated temperature.

6. A method of controlling a load wrapping apparatus of the type configured to wrap a load with packaging material dispensed from a packaging material dispenser through relative rotation between the packaging material dispenser and the load, the method comprising:
conveying a web of the packaging material through a pre-stretch assembly of the packaging material dispenser to pre-stretch the web of packaging material prior to dispensing the packaging material to the load; and
heating the web of packaging material prior to or while conveying the web through the pre-stretch assembly to reduce a pre-stretch force applied to the web;
wherein the pre-stretch assembly includes at least three pre-stretch rollers defining multiple zones that each pre-stretch the web of packaging material by a predetermined amount, and wherein the multiple zones include at least first and second zones configured to pre-stretch the web of packaging material by respective first and second amounts.

7. A method of controlling a load wrapping apparatus of the type configured to wrap a load with packaging material dispensed from a packaging material dispenser through relative rotation between the packaging material dispenser and the load, the method comprising:
conveying a web of the packaging material through a pre-stretch assembly of the packaging material dispenser to pre-stretch the web of packaging material prior to dispensing the packaging material to the load; and
heating the web of packaging material prior to or while conveying the web through the pre-stretch assembly to reduce a pre-stretch force applied to the web;
wherein the pre-stretch assembly includes a dispensing roller having a surface with reduced surface adhesion.

8. A method of controlling a load wrapping apparatus of the type configured to wrap a load with stretchable plastic packaging material containing recycled content and dispensed from a packaging material dispenser through relative rotation between the packaging material dispenser and the load, the method comprising:
conveying a web of the packaging material through a first zone of a pre-stretch assembly of the packaging material dispenser to pre-stretch the web of packaging material a first amount that is below a tear strength of the web of packaging material prior to dispensing the packaging material to the load; and
conveying the web of the packaging material through a second zone of the pre-stretch assembly to pre-stretch the web of packaging material a second amount that is below the tear strength of the web of packaging material prior to dispensing the packaging material to the load;
wherein the pre-stretch assembly includes at least three pre-stretch rollers defining the first and second zones.

9. The method of claim 8, further comprising heating the web of packaging material prior to or while conveying the web through the pre-stretch assembly to reduce a pre-stretch force applied to the web.

10. An apparatus, comprising a processor and program code configured upon execution by the processor to control a load wrapping apparatus of the type configured to wrap a load with stretchable packaging material that includes recycled content and that is dispensed from a packaging material dispenser through relative rotation between the packaging material dispenser and the load by:
conveying a web of the packaging material through a pre-stretch assembly of the packaging material dispenser to pre-stretch the web of packaging material prior to dispensing the packaging material to the load, wherein the pre-stretch assembly includes at least three pre-stretch rollers defining multiple zones that each pre-stretch the web of packaging material by a predetermined amount, and wherein the multiple zones include at least first and second zones configured to pre-stretch the web of packaging material by respective first and second amounts; and
heating the web of packaging material prior to or while conveying the web through the pre-stretch assembly to reduce a pre-stretch force applied to the web.

11. The apparatus of claim 10, wherein the processor is in a controller of the load wrapping apparatus.

12. The apparatus of claim 10, wherein the processor is in a device external to the load wrapping apparatus.

13. The apparatus of claim 12, wherein the device is a mobile device, a single-user computer or a multi-user computer.

14. The method of claim 6, wherein heating the web of packaging material comprises directing heated air onto the web of packaging material.

15. The method of claim 14, wherein directing heated air onto the web of packaging material is performed by one or more nozzles that face the web of packaging material.

16. The method of claim 14, wherein the one or more nozzles are in fluid communication with a heated enclosure within which a roll of the packaging material is held at an elevated temperature.

17. The method of claim 14, further comprising controlling a flow of the heated air based upon a dispensing rate of the packaging material dispenser.

18. The method of claim 14, wherein directing heated air onto the web of packaging material includes directing heated air on a portion of the web of packaging material upstream of the pre-stretch assembly.

19. The method of claim 14, wherein directing heated air onto the web of packaging material includes directing heated air on a portion of the web of packaging material within of the pre-stretch assembly.

20. The method of claim 14, wherein directing heated air onto the web of packaging material includes directing heated air on a first portion of the web of packaging material upstream of the pre-stretch assembly and directing heated air on a second portion of the web of packaging material within of the pre-stretch assembly.

* * * * *